(12) United States Patent
Suh et al.

(10) Patent No.: US 7,688,926 B2
(45) Date of Patent: Mar. 30, 2010

(54) FREQUENCY OVERLAY COMMUNICATION SYSTEM AND CONTROL METHOD THEREOF

(75) Inventors: Chang-Ho Suh, Seongnam-si (KR); Young-Kwon Cho, Suwon-si (KR); Dong-Seek Park, Yongin-si (KR); Jung-Soo Woo, Suwon-si (KR); Sung-Kwon Hong, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1014 days.

(21) Appl. No.: 11/407,799

(22) Filed: Apr. 20, 2006

(65) Prior Publication Data
US 2006/0240838 A1 Oct. 26, 2006

(30) Foreign Application Priority Data
Apr. 20, 2005 (KR) .................. 10-2005-0032923

(51) Int. Cl.
*H04K 1/10* (2006.01)
*H04W 4/00* (2009.01)

(52) U.S. Cl. ...................... 375/360; 370/329
(58) Field of Classification Search .......... 375/260, 375/267, 285, 295, 299; 370/329, 341, 350
See application file for complete search history.

(56) References Cited

U.S. PATENT DOCUMENTS

| 6,685,215 | B2 | 2/2004 | Keshavaraj | |
| 6,865,215 | B1* | 3/2005 | Russell et al. | 375/133 |
| 7,327,765 | B1* | 2/2008 | Ojard | 370/482 |
| 2003/0064743 | A1* | 4/2003 | Chen | 455/522 |
| 2005/0122917 | A1 | 6/2005 | Tiedemann, Jr. | |

FOREIGN PATENT DOCUMENTS

| CN | 1360800 | 7/2002 |
| GB | 2 332 817 | 6/1999 |
| JP | 06-120879 | 4/1994 |
| JP | 2000-013310 | 1/2000 |
| JP | 2000-134182 | 5/2000 |
| JP | 2002-335191 | 11/2002 |
| KR | 10-1998-074164 | 11/1998 |
| RU | 2 145 464 | 2/2000 |

* cited by examiner

*Primary Examiner*—Khanh C Tran
(74) *Attorney, Agent, or Firm*—The Farrell Law Firm, LLP

(57) ABSTRACT

A frequency overlay communication system that includes a first communication system for performing communication using a first frequency band being a preset bandwidth; and a second communication system for performing communication using a second frequency band being a second preset bandwidth, wherein the second frequency band includes the first frequency band.

21 Claims, 11 Drawing Sheets

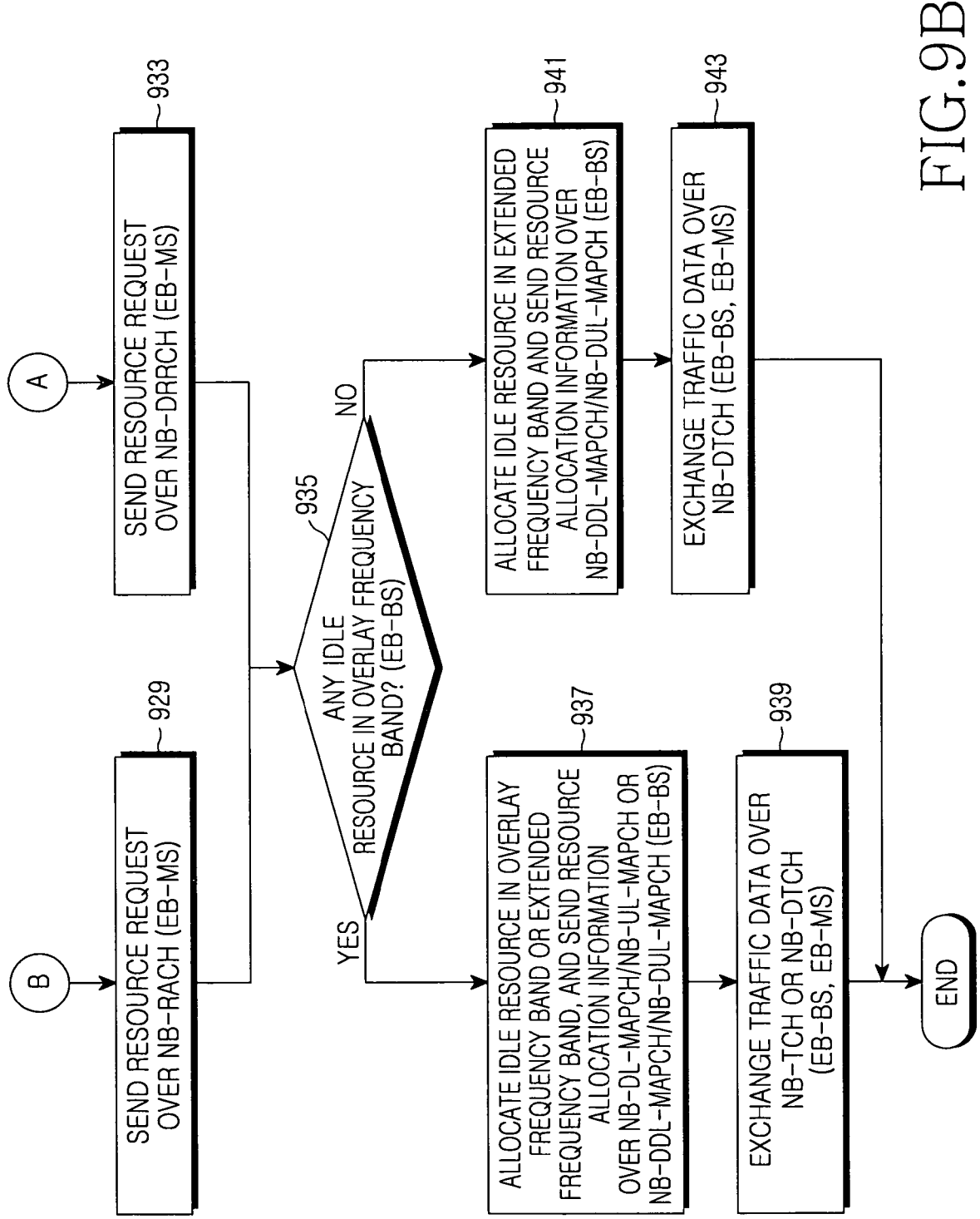

FREQUENCY OVERLAY COMMUNICATION SYSTEM AND CONTROL METHOD THEREOF

PRIORITY

This application claims the benefit under 35 U.S.C. § 119(a) of an application entitled "Frequency Overlay Communication System and Control Method thereof" filed in the Korean Intellectual Property Office on Apr. 20, 2005 and assigned Serial No. 2005-32923, the entire contents of which are incorporated herein by reference.

BACKGROUND OF THE INVENTION

1. Field of the Invention

The present invention relates generally to a communication system and a control method thereof, and in particular, to a communication system using a frequency overlay scheme (hereinafter referred to as a "frequency overlay communication system") and a control method thereof.

2. Description of the Related Art

With the development of communication systems, diverse types of services are being provided, raising the need for a broadband communication system supporting these broadband services. However, due to the limited frequency resources, there is a limitation on the available frequency band even for the broadband communication system. In addition, because backward compatibility with the previously installed communication systems should also be taken into consideration, design of the broadband communication systems raises many difficulties.

The current broadband communication systems were designed on the basic assumption that they are separately allocated different frequency bands to provide the broadband service in their service areas. However, the increasing demand for frequency bands for the broadband service increases the license cost for the frequency bands, making it impossible to use the various available schemes proposed to provide the broadband service.

As a result, there is a need for a scheme for efficiently providing the broadband service while overcoming the limitation on the frequency bands, i.e., solving the high license cost problem associated with the frequency bands.

SUMMARY OF THE INVENTION

It is, therefore, an object of the present invention to provide a frequency overlay communication system for increasing efficiency of frequency resources, and a control method thereof.

It is another object of the present invention to provide a frequency overlay communication system for maximizing a multiuser diversity gain, and a control method thereof.

It is further another object of the present invention to provide a frequency overlay communication system for guaranteeing backward compatibility with the existing communication systems, and a control method thereof.

According to one aspect of the present invention, there is provided a frequency overlay communication system that includes a first communication system for performing communication using a first frequency band being a preset bandwidth; and a second communication system for performing communication using a second frequency band being a second preset bandwidth, wherein the second frequency band includes the first frequency band.

According to another aspect of the present invention, there is provided a frequency overlay communication system using a first frequency band and a second frequency band including the first frequency band, the system including a mobile station for, upon acquiring a cell, performing random access to a base station using a random access channel signal, and upon receiving a grant for the random access from the base station, sending a resource allocation request to the base station; and the base station for allocating an idle resource in the second frequency band in response to the resource allocation request from the mobile station.

According to further another aspect of the present invention, there is provided a transmission apparatus in a frequency overlay communication system using a first frequency band and a second frequency band including the second frequency band, the apparatus including a preamble channel generator for generating a preamble channel signal; a pilot channel generator for generating a pilot channel signal; a traffic channel generator for generating a traffic channel signal; a control channel generator for generating a control channel signal; a scheduler for, upon generation of data to be transmitted, scheduling the data and allocating a frequency band over which the data is to be transmitted according to the second frequency band; a multiplexer for generating a downlink channel signal by multiplexing the preamble channel signal, the pilot channel signal, the traffic channel signal, and the control channel signal according to information on the allocated frequency band; and an inverse fast Fourier transform (IFFT) unit for performing IFFT on the downlink channel signal.

According to yet another aspect of the present invention, there is provided a transmission apparatus in a frequency overlay communication system using a first frequency band and a second frequency band including the first frequency band, the apparatus including a synchronization channel generator for generating a synchronization channel signal; a random access channel generator for generating a random access channel signal; a traffic channel generator for generating a traffic channel signal; a control channel generator for generating a control channel signal; a multiplexer for generating an uplink channel signal by multiplexing the synchronization channel signal, the random access channel signal, the traffic channel signal, and the control channel signal, on the multiplexing based on a previous frequency band allocation of the second frequency band; and an inverse fast Fourier transform (IFFT) unit for performing IFFT on the uplink channel signal.

According to still another aspect of the present invention, there is provided a reception apparatus in a frequency overlay communication system using a first frequency band and a second frequency band including the first frequency band, the apparatus including a fast Fourier transform (FFT) unit for performing FFT on a received signal; and a demultiplexer for demultiplexing the FFT-processed received signal into a preamble channel signal, a pilot channel signal, a traffic channel signal and a control channel signal, the demultiplexing based on a previous allocation of a frequency band.

According to still another aspect of the present invention, there is provided a reception apparatus in a frequency overlay communication system using a first frequency band and a second frequency band including the first frequency band, the apparatus including a fast Fourier transform (FFT) unit for performing FFT on a received signal; and a demultiplexer for demultiplexing the FFT-processed received signal into a synchronization channel signal, a random access channel signal, a traffic channel signal and a control channel signal, said demultiplexing based on a previous allocation of a frequency band; wherein the second frequency band includes the first frequency band and a third frequency band dependent on the first frequency band.

According to still another aspect of the present invention, there is provided a control method for a frequency overlay communication system, the method including communicating, by a first communication system using a first frequency band being a first preset bandwidth; and communicating, by a second communication system using a second frequency band being a second preset bandwidth, wherein the second frequency band includes the first frequency band.

According to still another aspect of the present invention, there is provided a control method for a frequency overlay communication system using a first frequency band and a second frequency band including the first frequency band, the method including upon acquiring a cell, performing, by a mobile station, random access to a base station using a random access channel signal, and upon receiving a grant of the random access from the base station, sending a resource allocation request to the base station; and allocating, by the base station, an idle resource in the second frequency band in response to the resource allocation request.

According to still another aspect of the present invention, there is provided a transmission method in a frequency overlay communication system using a first frequency band and a second frequency band including the first frequency band, the method including generating a preamble channel signal; generating a pilot channel signal; generating a traffic channel signal; generating a control channel signal; upon generation of data to be transmitted, scheduling the data and allocating a frequency band over which the data is to be transmitted according to the second frequency band; generating a downlink channel signal by multiplexing the preamble channel signal, the pilot channel signal, the traffic channel signal, and the control channel signal according to information on the allocated frequency band; and performing inverse fast Fourier transform (IFFT) on the downlink channel signal.

According to still another aspect of the present invention, there is provided a transmission method in a frequency overlay communication system using a first frequency band and a second frequency band including the first frequency band, the method including generating a synchronization channel signal; generating a random access channel signal; generating a traffic channel signal; generating a control channel signal; generating an uplink channel signal by multiplexing the synchronization channel signal, the random access channel signal, the traffic channel signal, and the control channel signal, said multiplexing based on a previous allocation of a frequency band of the second frequency band; and performing inverse fast Fourier transform (IFFT) on the uplink channel signal.

According to still another aspect of the present invention, there is provided a reception method in a frequency overlay communication system using a first frequency band and a second frequency band including the first frequency band, the method including performing fast Fourier transform (FFT) on a received signal; and demultiplexing the FFT-processed received signal into a preamble channel signal, a pilot channel signal, a traffic channel signal and a control channel signal, said demultiplexing based on a previous allocation of a frequency band.

According to still another aspect of the present invention, there is provided a reception method in a frequency overlay communication system using a first frequency band and a second frequency band including the first frequency band, the method including performing fast Fourier transform (FFT) on a received signal; and demultiplexing the FFT-processed received signal into a synchronization channel signal, a random access channel signal, a traffic channel signal and a control channel signal, said demultiplexing based on a previous allocation of a frequency band; wherein the second frequency band includes the first frequency band and the third frequency band dependent on the first frequency band.

According to still another aspect of the present invention, there is provided a cell acquisition method in a frequency overlay communication system using a first frequency band and a second frequency band including the first frequency band, the method including receiving a first preamble signal over the first frequency band; performing cell acquisition for a first base station providing a service over the second frequency band if received power of the first preamble signal exceeds a threshold; and performing cell acquisition for a second base station providing a service over the first frequency band if received power of the second preamble signal does not exceeds the threshold.

According to still another aspect of the present invention, there is provided a frame structure in a frequency overlay system using a first frequency band and a second frequency band including the first frequency band, the method including setting a frame of a first communication system over a first frequency band; setting a frame of a second communication system over a second frequency band including the first frequency band and a third frequency band dependent on the first frequency band.

BRIEF DESCRIPTION OF THE DRAWINGS

The above and other objects, features and advantages of the present invention will become more apparent from the following detailed description when taken in conjunction with the accompanying drawings in which:

FIGS. 9A and 9B are flowcharts illustrating a traffic data transmission/reception process between an EB-MS and an EB-BS in an EB communication system according to the present invention;

DETAILED DESCRIPTION OF EXEMPLARY EMBODIMENTS

Preferred embodiments of the present invention will now be described in detail with reference to the annexed drawings. In the following description, a detailed description of known functions and configurations incorporated herein has been omitted for clarity and conciseness.

The present invention provides a communication system using a frequency overlay scheme (hereinafter referred to as a "frequency overlay communication system") and a control method thereof. In addition, the present invention provides a frequency overlay communication system capable of solving the high license cost problem for frequency bands due to the limited number of frequency bands, guaranteeing backward compatibility with the existing communication systems based on the use of the frequency overlay scheme, and providing the maximum throughput through efficient scheduling, and a control method thereof.

Figure 1:
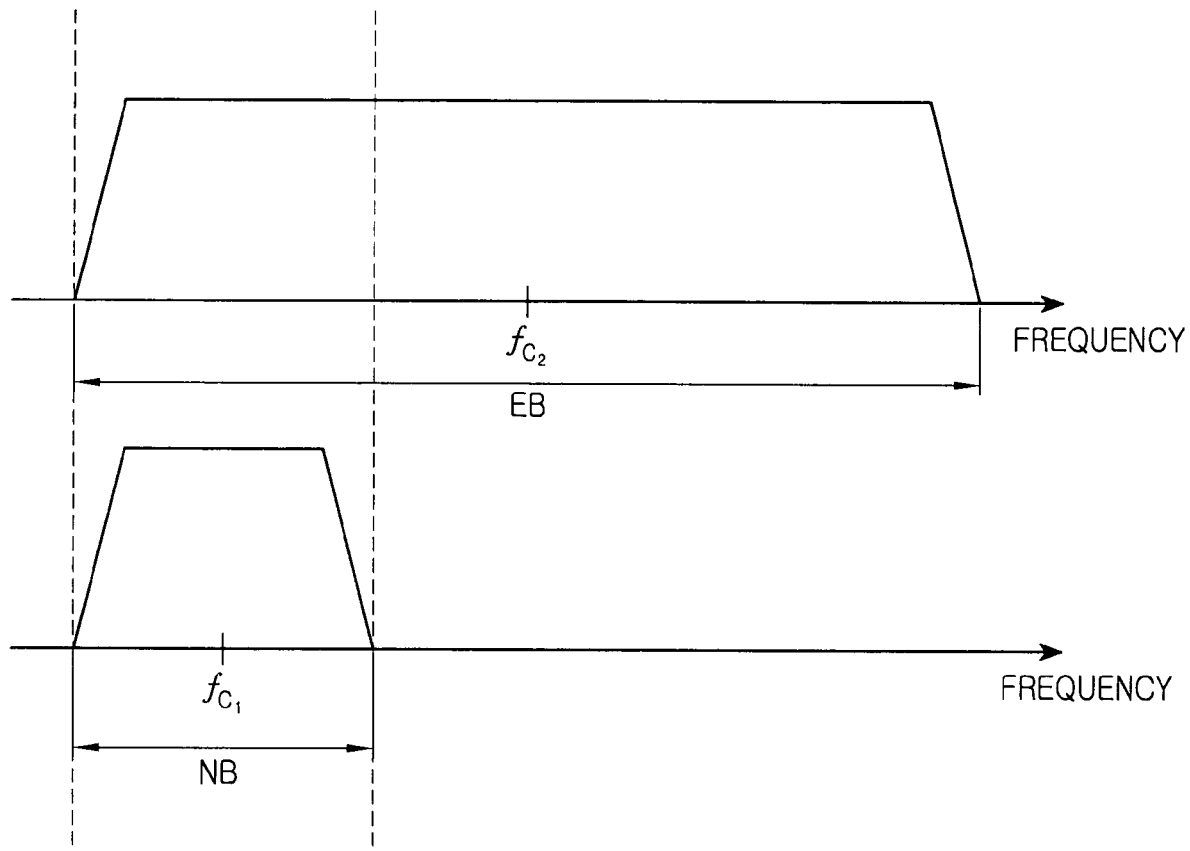
FIG. 1 is a diagram illustrating a frequency allocation operation in a frequency overlay communication system according to the present invention.

FIG. 1 is a diagram illustrating a frequency allocation operation in a frequency overlay communication system according to the present invention.

It will be assumed in FIG. 1 that as illustrated, the communication system previously installed before the frequency overlay communication system is designed, i.e., a non-frequency overlay communication system, already uses a carrier frequency $fc_1$ and its associated frequency band.

The non-frequency overlay communication system will be referred to as a Narrow Band (NB) communication system and the frequency overlay communication system will be referred to as an Extended Band (EB) communication system. The non-frequency overlay communication system is referred to as an NB communication system because a frequency band used in the non-frequency overlay communication system is relatively narrower than a frequency band used in the frequency overlay communication system. This does not mean that the frequency band used in the non-frequency overlay communication system is absolutely narrow.

If the types of services intended to be provided in the NB communication system are diversified and the required throughput increases, the NB communication system should extend a bandwidth of its frequency band in use. Therefore, a communication system, the bandwidth of whose frequency band in use is extended, can be taken into consideration, and the communication system with the extended bandwidth of its frequency band in use can be designed such that it is overlaid with the NB communication system in a frequency band. The communication system, whose frequency band in use is determined in such a manner that it is overlaid with the NB communication system in the frequency band, is an EB communication system. Application of the frequency overlay scheme is taken into consideration for the following purposes.

(1) For Reduction in License Cost for Frequency Band

The license cost occurring because of the extension of the required frequency band greatly increases due to the limited frequency resources. The increase in the license cost for the frequency bands is a heavy burden on the service providers. Deployment of a frequency band being different from the frequency band used in the NB communication system not using the frequency overlay scheme causes additional license cost for the frequency bands. One area where there are additional license costs is in the case where a new NB communication system uses a new frequency band. However, the use of the frequency overlay scheme requires only the additional license cost for the bandwidth additionally increased. As a result, the burden of the license cost for the frequency bands on the service providers decreases because they are allowed to bear only the additional license cost.

(2) For Increase in Frequency Resource Efficiency in Overlay Frequency Band

The use of the frequency overlay scheme illustrated in FIG. 1 increases frequency resource efficiency in the overlaid frequency band. One of the factors for determining performance of the general communication system is frequency efficiency, and the frequency efficiency is also very important for the service providers because the service providers can benefit from their subscribers in proportion to the frequency resource efficiency.

Generally, an increase in the number of subscribers available in a particular frequency band can acquire a scheduling gain, which is called a multiuser diversity gain. Therefore, when the frequency overlay scheme is used, the overlay frequency band is shared not only by the subscribers of the NB communication system but also by the subscribers of the EB communication system, resulting in an increase in the number of subscribers available in the overlay frequency band. This contributes to an increase in the frequency resource efficiency. A specific increment in the frequency resource efficiency differs according to a scheduling scheme of a scheduler used in the EB communication system, and it is preferable to use a scheduling scheme that maximizes the frequency resource efficiency.

Figure 2:
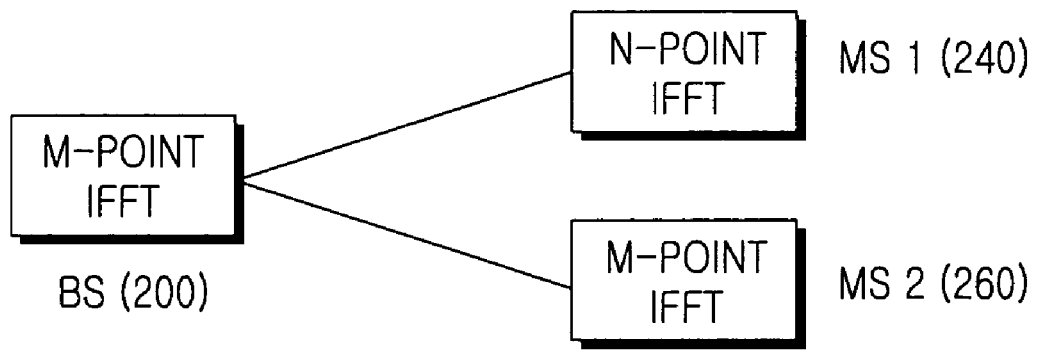
FIG. 2 is a diagram illustrating an exemplary transceiver module used in an EB communication system according to the present invention.

FIG. 2 is a diagram illustrating an exemplary transceiver module used in an EB communication system according to the present invention.

It is assumed in FIG. 2 that the number of Inverse Fast Fourier Transform (IFFT)/Fast Fourier Transform (FFT) points of a transceiver module used in a communication system before a bandwidth of its frequency band in use is extended, i.e., an NB communication system, is N, and the number of IFFT/FFT points of a transceiver module used in a communication system after a bandwidth of its frequency band in use is extended, i.e., an EB communication system, is M (where M>N).

A base station (BS) 200 can support services to a mobile station (MS), i.e., an MS1 240, of the NB communication system and an MS, i.e., an MS2 260, of the EB communication system simply with an M-point IFFT/FFT module without separately including an N-point IFFT/FFT module. In order to support services to the MSs of both the NB communication system and the EB communication system with one IFFT/FFT module, i.e., the M-point IFFT/FFT module, it is necessary to provide a guard band between boundary frequency bands of the NB communication system and the EB communication system. A specific size of the guard band depends upon the performance characteristics of a band-pass filter (BPF), and a detailed description of the guard band will be made later.

Figure 3:
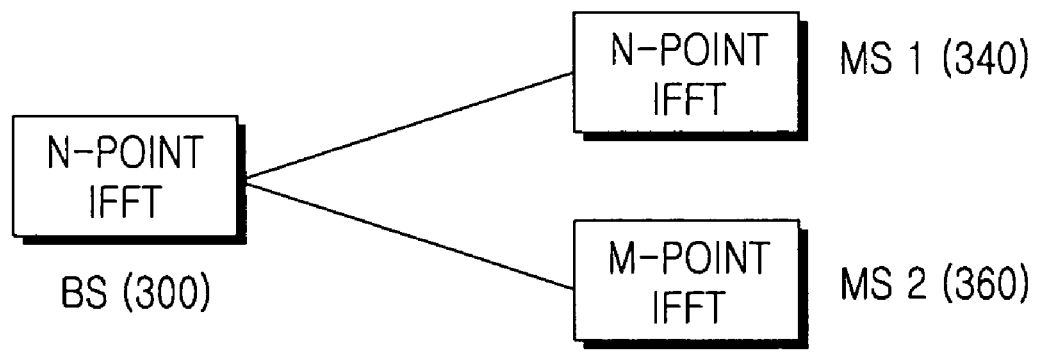
FIG. 3 is a diagram illustrating an alternative exemplary transceiver module used in an EB communication system according to the present invention.

FIG. 3 is a diagram illustrating an alternative exemplary transceiver module used in an EB communication system according to the present invention.

Similarly, it is assumed in FIG. 3 that the number of IFFT/FFT points of a transceiver module used in the NB communication system is N, and the number of IFFT/FFT points of a transceiver module used in the EB communication system is M (where M>N).

On the contrary, however, when the system is extended, BSs using the frequency overlay scheme may be deployed in such way that in a particular region, BSs using the frequency overlay scheme cannot be deployed and only the BSs not using the frequency overlay scheme can be deployed. For convenience, in the following description, the BS using the frequency overlay scheme will be referred to as an 'EB-BS', and the BS not using the frequency overlay scheme will be referred to as an 'NB-BS'.

Of course, after the system extension is completed, there is almost no case where only the NB-BSs are deployed in a particular region. However, in the course of the system extension, such cases inevitably occur. Therefore, unlike the BS 200 of FIG. 2, the BS 300 of FIG. 3, if it is an NB-BS, should take into account even the IFFT/FFT points of the transceiver module used in the EB communication system.

The BS 300 uses only an N-point IFFT/FFT module, because it is an NB-BS as stated above. As described with reference to FIG. 2, if there is only the guard band between the frequency band used in the EB communication system and the frequency band used in the NB communication system, the NB-BS 300 can communicate not only with an MS1 340 having an N-point IFFT/FFT module but also with an MS2 360 having an M-point IFFT/FFT module, using only the N-point IFFT/FFT module. Also, as described with reference to FIG. 2, a specific size of the guard band depends upon performance of a BPF, and a detailed description of the guard band will be made later.

Figure 4:
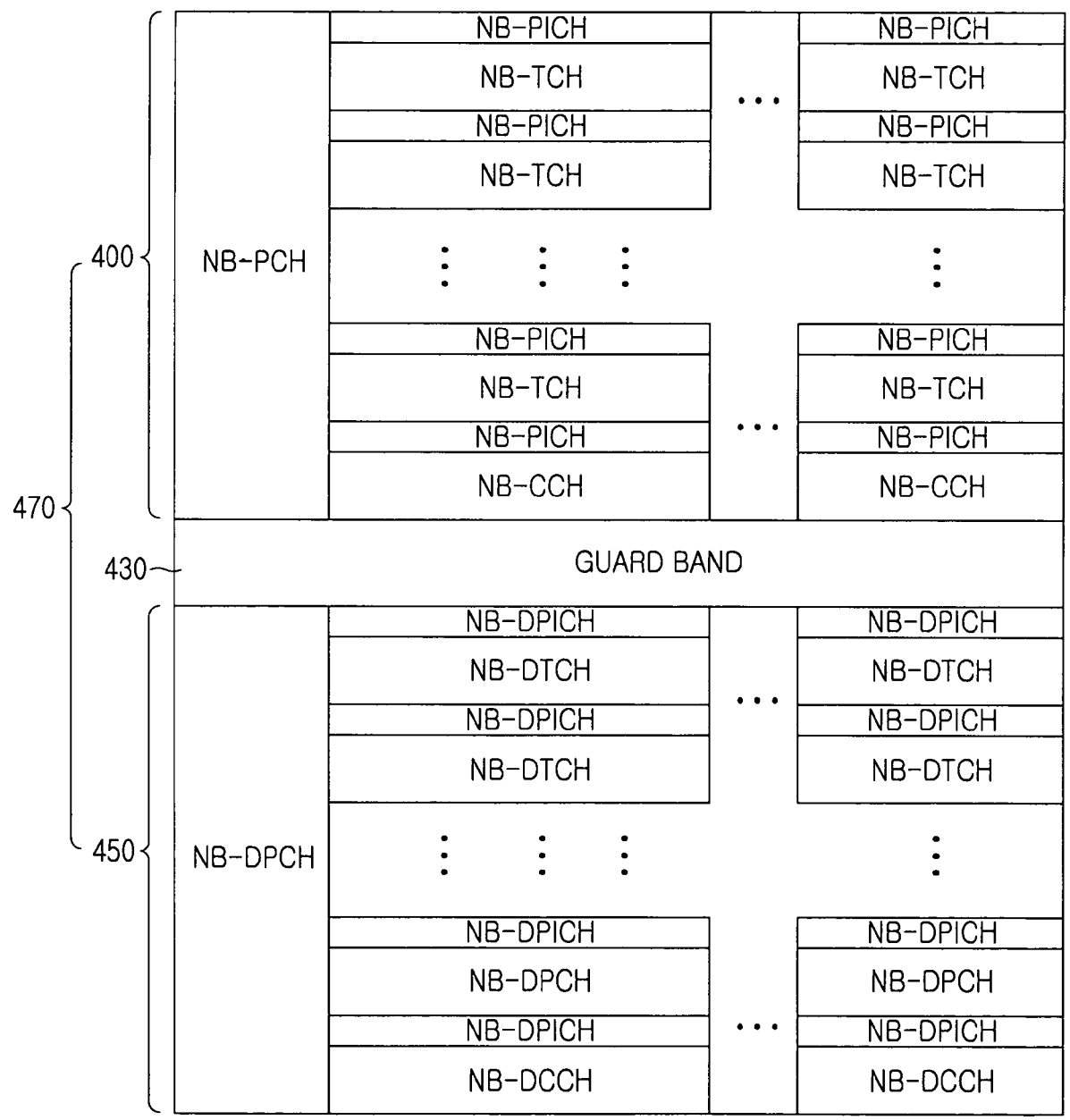
FIG. 4 is a diagram illustrating a downlink frame structure of an EB communication system according to the present invention.

FIG. 4 is a diagram illustrating a downlink frame structure of an EB communication system according to the present invention.

Referring to FIG. 4, a downlink frame 470 of the EB communication system (hereinafter referred to as an "EB communication system downlink frame") includes a downlink frame 400 currently used in the NB communication system (hereinafter referred to as an "NB communication system downlink frame"), a downlink frame dependently added to the NB communication system for the EB communication system, i.e., an NB communication system dependent downlink frame 450, and a guard band 430 between the NB communication system downlink frame 400 and the NB communication system dependent downlink frame 450.

The NB communication system downlink frame 400 includes a Narrow Band-Preamble Channel (NB-PCH), a Narrow Band-Pilot Channel (NB-PICH), a Narrow Band-Traffic Channel (NB-TCH), and a Narrow Band-Control Channel (NB-CCH).

The NB communication system dependent downlink frame 450 includes a Narrow Band-Dependent Preamble Channel (NB-DPCH), a Narrow Band-Dependent Pilot Channel (NB-DPICH), a Narrow Band-Dependent Traffic Channel (NB-DTCH), and a Narrow Band-Dependent Control Channel (NB-DCCH).

As described above, the EB communication system downlink frame 470 includes the NB communication system downlink frame 400, the guard band 430, and the NB communication system dependent downlink frame 450. In conclusion, the EB communication system has the following downlink channel structure.

An Extended Band-Preamble Channel (EB-PCH) of the EB communication system includes the NB-PCH and the NB-DPCH. Second, an Extended Band-Pilot Channel (EB-PICH) of the EB communication system includes the NB-PICH and the NB-DPICH. Third, an Extended Band-Traffic Channel (EB-TCH) of the EB communication system includes the NB-TCH and the NB-DTCH. Finally, an Extended Band-Control Channel (EB-CCH) of the EB communication system includes the NB-CCH and the NB-DCCH.

First, the EB-PCH not only includes the intact NB-BCH for compatibility between NB communication system and the EB communication system, but also should be designed in such a way that it minimizes a correlation with the NB-PCH and maximizes time/frequency synchronization and channel estimation performance. Therefore, the NB-DPCH needs a structure dependent on the NB-PCH. In addition, the EB-PCH should be designed such that it is available for cell acquisition as well as the time/frequency synchronization and channel estimation. Although the cell acquisition may be possible using the EB-PCH, the cell acquisition may also be possible using the EB-PICH rather than the EB-PCH. For convenience, it will be assumed herein that the cell acquisition is performed using the EB-PICH.

Second, the EB-PICH not only includes the intact NB-PICH for compatibility between NB communication system and the EB communication system, but also includes the NB-DPICH having a structure dependent on the NB-PICH. Although not only the cell acquisition can be performed using the EB-PICH, but also the time/frequency synchronization and channel estimation can be performed using the EB-PCH as described above, it will be assumed herein that only the cell acquisition is performed using the EB-PICH.

A description will now be made of schemes for acquiring cells using the EB-PICH.

A first scheme acquires a cell using a pilot pattern generated according to a position of a time-frequency domain.

The first scheme has no pilot pattern defined as a separate sequence because it detects a pilot pattern according to a position in the time-frequency domain. That is, a pilot pattern is generated according to a position in the time-frequency domain, at which the EB-PICH signal is transmitted, and a corresponding cell is acquired according to the generated pilot pattern. However, the first scheme is limited in the number of distinguishable pilot patterns because the pilot pattern should be unique in the time-frequency domain. Generally, because the development of communication systems causes a rapid increase in the number of cells, i.e., BSs, constituting the communication systems, the limitation in the number of distinguishable cells due to the use of the first scheme serves as a negative factor in configuring the entire system.

A second scheme acquires a cell using a pilot pattern defined as a sequence in a fixed position of a time-frequency domain.

Because the second scheme acquires a cell using a pilot pattern having a predefined sequence in a fixed position of the time-frequency domain, the second scheme detects the pilot pattern taking into account not only the position but also the sequence of the time-frequency domain, thereby increasing the number of distinguishable cells. Of course, the second scheme should be designed such that orthogonality is maintained between the pilot patterns, i.e., between the sequences, and compatibility and orthogonality between the NB communication system and the EB communication system is maintained. A scheme for generating sequences constituting the pilot pattern is not directly related to the present invention, so a detailed description thereof will be omitted herein. However, it should be noted that the pilot patterns of the NB communication system and the EB communication system can be generated either independently or dependently.

For compatibility between the NB communication and the EB communication system, the EB-TCH not only includes the intact NB-TCH but also includes the NB-DTCH having a structure dependent on the NB-TCH, and for the compatibility between the NB communication and the EB communication system, the EB-CCH not only includes the intact NB-CCH but also includes the NB-DCCH having a structure dependent on the NB-CCH. A detailed description of the EB-TCH and the EB-CCH will be given later.

Figure 5:
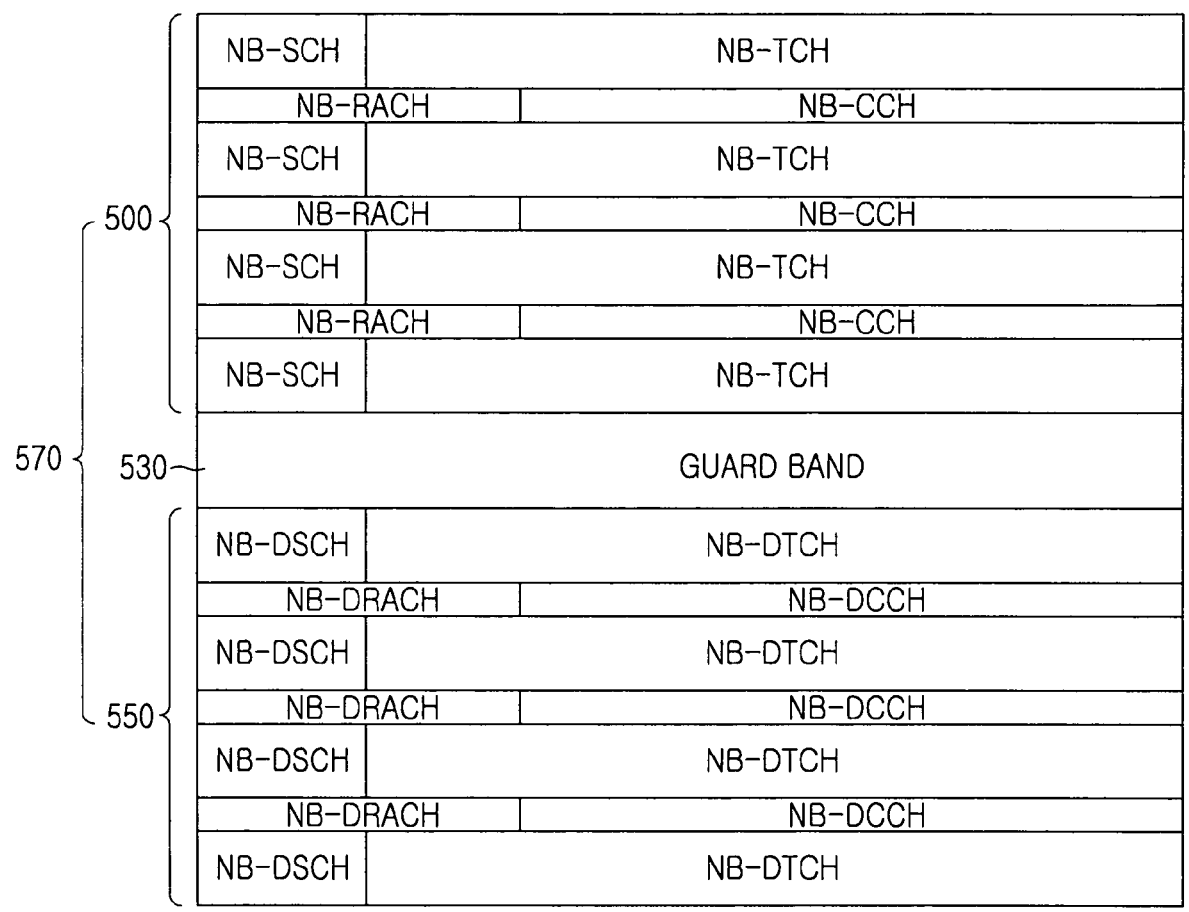
FIG. 5 is a diagram illustrating an uplink frame structure of an EB communication system according to the present invention.

FIG. 5 is a diagram illustrating an uplink frame structure of an EB communication system according to the present invention.

Referring to FIG. 5, an uplink frame 570 of the EB communication system (hereinafter referred to as an "EB communication system uplink frame") includes an uplink frame 500 currently used in the NB communication system (hereinafter referred to as an "NB communication system uplink frame"), an uplink frame dependently added to the NB communication system for the EB communication system, i.e., an NB communication system dependent uplink frame 550, and a guard band 530 between the NB communication system uplink frame 500 and the NB communication system dependent uplink frame 550.

The NB communication system uplink frame 500 includes a Narrow Band-Synchronization Channel (NB-SCH), a Narrow Band-Random Access Channel (NB-RACH), an NB-CCH and an NB-TCH. The NB-TCH in the NB communication system uplink frame 500 is an uplink channel, and the NB-TCH in the NB communication system downlink frame 400 is a downlink channel, but they are similar to each other in actual operation. However, the NB-CCH in the NB communication system uplink frame 500 is very different in operation from the NB-CCH in the NB communication system downlink frame 400, and a detailed description thereof will be made later.

The NB communication system dependent uplink frame 550 includes a Narrow Band-Dependent Synchronization Channel (NB-DSCH), a Narrow Band-Dependent Random Access Channel (NB-DRACH), an NB-DCCH and an NB-DTCH. The NB-DTCH in the NB communication system dependent uplink frame 550 is an uplink channel, and the NB-DTCH in the NB communication system dependent downlink frame 450 is a downlink channel, but they are similar to each other in actual operation. However, the NB-DCCH in the NB communication system uplink frame 500 is very different in operation from the NB-DCCH in the NB communication system downlink frame 400, and a detailed description thereof will be made later.

As described above, the EB communication system uplink frame 570 includes the NB communication system uplink frame 500, the guard band 530, and the NB communication system dependent uplink frame 550. In conclusion, the EB communication system has the following uplink channel structure.

First, an Extended Band-Synchronization Channel (EB-SCH) of the EB communication system includes the NB-SCH and the NB-DSCH. Second, an Extended Band-Random Access Channel (EB-RACH) of the EB communication system includes the NB-RACH and the NB-DRACH. Third, an Extended Band-Channel Quality Information Channel (EB-CQICH) of the EB communication system includes an NB-CQICH and an NB-DCQICH. Fourth, an Extended Band-Ack/Nack Channel (EB-ANCH) of the EB communication system includes an NB-ANCH and an NB-DANCH. Finally, an EB-TCH of the EB communication system includes an NB-TCH and an NB-DTCH.

Although not separately illustrated in FIG. 5, the other uplink resources except for the EB-SCH, EB-RACH, EB-CQICH, EB-ANCH and EB-TCH may be allocated for a separate control channel for transmission/reception of control information. Each of the uplink channels of the EB communication system will be described in detail later.

Figure 6:
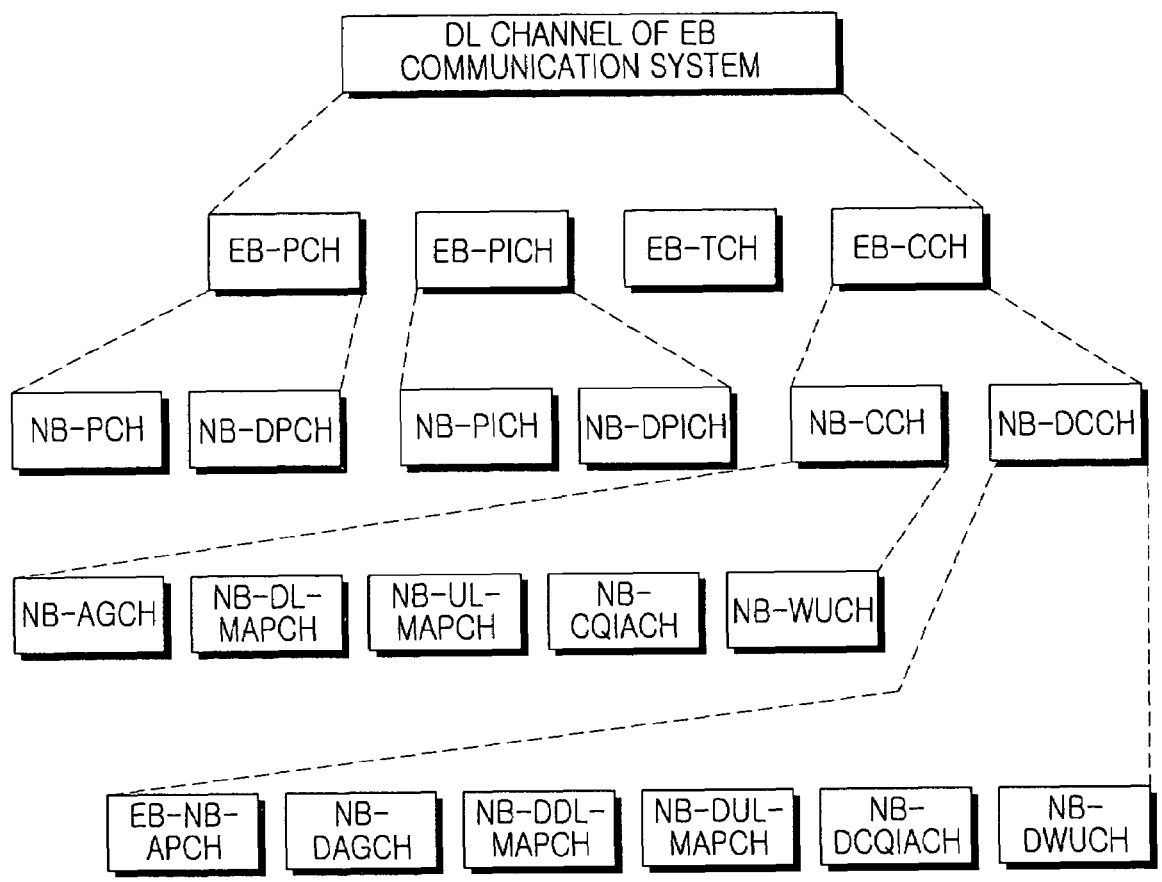
FIG. 6 is a diagram illustrating a downlink channel structure of an EB communication system according to the present invention.

FIG. 6 is a diagram illustrating a downlink channel structure of an EB communication system according to the present invention.

Referring to FIG. 6, the downlink channel of the EB communication system includes an EB-PCH, an EB-PICH, an EB-TCH, and an EB-CCH, as described in connection with FIG. 4.

The EB-PCH, a channel transmitted at the beginning of a downlink frame, includes an NB-PCH and an NB-DPCH, and can be used for time/frequency synchronization acquisition, channel estimation and cell acquisition.

The EB-PICH, a channel time-multiplexed with the EB-TCH and the EB-CCH after the EB-PCH, includes an NB-PICH and an NB-DPICH, and can be used for time/frequency synchronization acquisition, channel estimation and cell acquisition, like the EB-PCH.

The EB-TCH includes an NB-TCH and an NB-DTCH, and transmits traffic data thereover.

The EB-CCH, a control channel for downlink random access, resource request and traffic data control, includes an NB-CCH and an NB-DCCH, a description of which will be given below.

First, the NB-CCH includes a Narrow Band-Access Grant Channel (NB-AGCH), a Narrow Band-Downlink MAP Channel (NB-DL-MAPCH), a Narrow Band-Uplink MAP Channel (NB-UL-MAPCH), a Narrow Band-Channel Quality Information Amount Channel (NB-CQIACH), and a Narrow Band-Wake-Up Channel (NB-WUCH).

Next, the NB-DCCH includes an Extended Band-Narrow Band Access Permission Channel (EB-NB-APCH), a Narrow Band-Dependent Access Grant Channel (NB-DAGCH), a Narrow Band-Dependent Downlink MAP Channel (NB-DDL-MAPCH), a Narrow Band-Dependent Uplink MAP Channel (NB-DUL-MAPCH), a Narrow Band-Dependent Channel Quality Information Amount Channel (NB-DCQI-ACH), and a Narrow Band-Dependent Wake-Up Channel (NB-DWUCH).

The NB-AGCH includes grant information for a random access of an MS when the MS attempts the random access over an uplink, i.e., an NB-RACH. A detailed description of the NB-AGCH will be made later.

The NB-DL-MAPCH includes necessary information for restoration of downlink traffic data of the NB-TCH, and the necessary information for restoration of downlink traffic data of the NB-TCH refers to resource area information, modulation scheme information and coding scheme information applied to the NB-TCH.

The NB-UL-MAPCH includes necessary information for restoration of uplink traffic data of the NB-TCH, and the necessary information for restoration of uplink traffic data of the NB-TCH refers to resource area information, modulation scheme information and coding scheme information applied to the NB-TCH.

The NB-CQIACH includes information on the CQI amount that an MS receiving a service via the NB communication system (hereinafter referred to as an "NB-MS") should be feed back. Of course, when the NB communication system is set to transmit all CQIs for all frequency bands used therein, the CQI amount to be fed back by the NB-MS is fixed, and when the NB communication system is set not to transmit all CQIs for all frequency bands used therein, the CQI amount to be fed back by the NB-MS is variable. The NB communication system can allow the NB-MS to feed back the CQI only for some frequency bands rather than all frequency bands used therein taking into account the uplink signaling overhead, and a description thereof will be omitted herein because it is not directly related to the present invention.

The NB-WUCH includes information used for waking up an NB-MS in a sleep mode when the NB-MS is in the sleep mode. An operation of waking up the NB-MS in the sleep mode will not be described herein, because it is not directly related to the present invention.

The EB communication system basically controls an MS receiving a service via the EB communication system (hereinafter referred to as an "EB-MS") to perform random access to an EB-BS through an NB-DRACH. However, when the number of MSs using the NB-RACH is less than the number of MSs using the NB-DRACH, the EB communication system should grant use of the NB-RACH even for the EB-MS in order to increase the system efficiency. The EB-NB-APCH includes information indicating grant of the use of the NB-RACH for the EB-MS, and a description of the EB-NB-APCH will be given later.

The NB-DAGCH includes grant information for random access of the EB-MS that is performing the random access over the NB-DRACH, and a description of the NB-DAGCH will be made later.

The NB-DDL-MAPCH includes necessary information for restoration of downlink traffic data of the NB-DTCH, and the necessary information for restoration of downlink traffic data of the NB-DTCH refers to resource area information, modulation scheme information and coding scheme information applied to the NB-DTCH.

The NB-DUL-MAPCH includes necessary information for restoration of uplink traffic data of the NB-DTCH, and the necessary information for restoration of uplink traffic data of the NB-DTCH refers to resource area information, modulation scheme information and coding scheme information applied to the NB-DTCH.

The NB-DCQIACH includes information on the CQI amount that the EB-MS should feed back. Of course, when the EB communication system is set to transmit all CQIs for all frequency bands used therein, the CQI amount to be fed back by the EB-MS is fixed, and when the EB communication system is set not to transmit all CQIs for all frequency bands used therein, the CQI amount to be fed back by the EB-MS is variable. The EB communication system can allow the EB-MS to feed back the CQI only for some frequency bands rather than all frequency bands used therein taking into account the uplink signaling overhead, and a description thereof will be omitted herein because it is not directly related to the present invention.

The NB-DWUCH includes information used for waking up an EB-MS in a sleep mode when the EB-MS is in the sleep mode. An operation of waking up the EB-MS in the sleep mode will not be described herein, because it is not directly related to the present invention.

In addition to the control channels used for performing the functions described in FIG. 6, control channels used for performing new functions may be included in the downlink channel structure.

Figure 7:
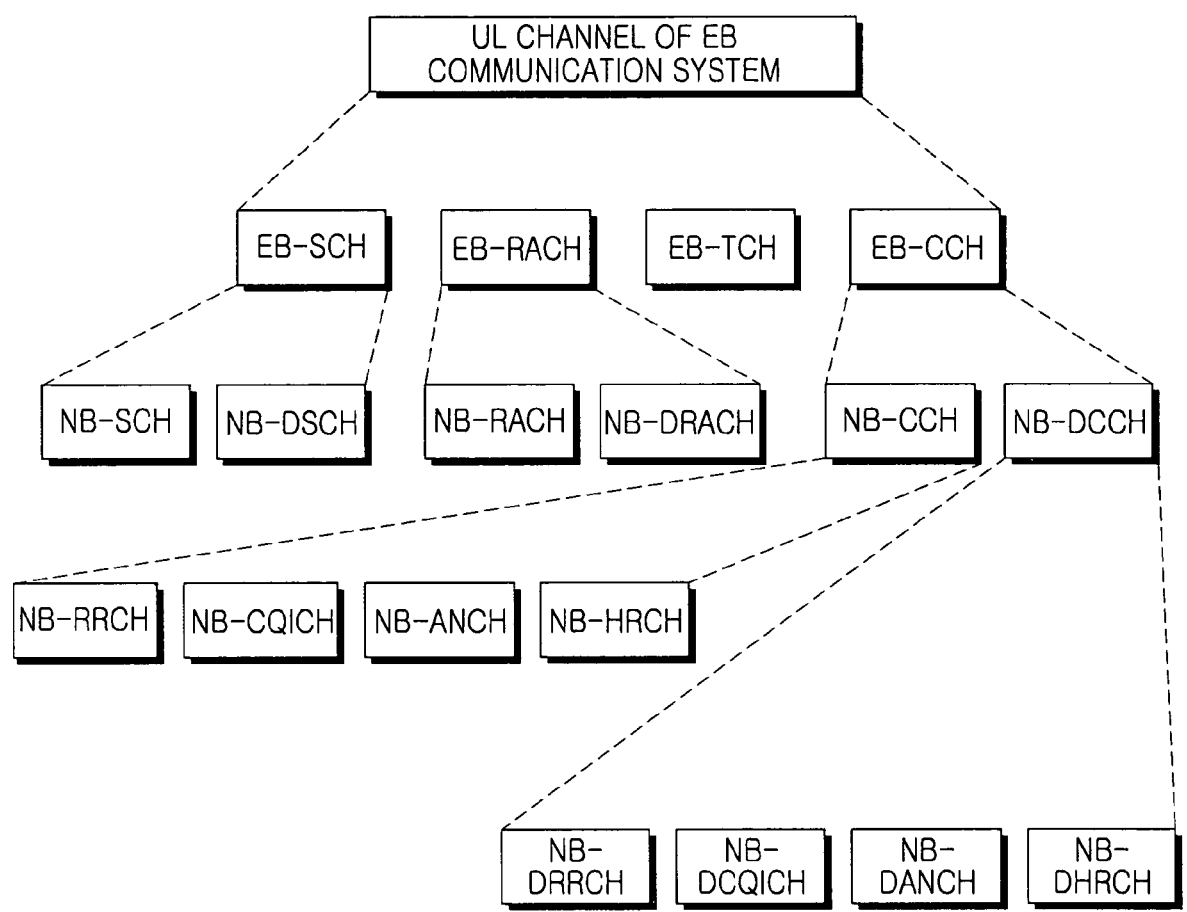
FIG. 7 is a diagram illustrating an uplink channel structure of an EB communication system according to the present invention.

FIG. 7 is a diagram illustrating an uplink channel structure of an EB communication system according to the present invention.

Referring to FIG. 7, the uplink channel of the EB communication system includes an EB-SCH, an EB-RACH, an EB-CCH, and an EB-TCH, as described in connection with FIG. 5.

The EB-SCH includes an NB-SCH and an NB-DSCH, and can be used to acquire uplink time/frequency synchronization and perform resource request.

The EB-RACH includes an NB-RACH and an NB-DRACH, and an NB-MS or an EB-MS performs random access to an NB-BS or an EB-BS through the EB-RACH. An operation of performing random access to the NB-BS or the EB-BS by the NB-BS or the EB-BS will be described in detail later.

The EB-CCH includes an NB-CCH and an NB-DCCH, a description of which will be given below.

The NB-CCH includes a Narrow Band-Resource Request Channel (NB-RRCH), a Narrow Band-Channel Quality Information Channel (NB-CQICH), a Narrow Band-Ack/Nack Channel (NB-ANCH), and a Narrow Band-Handoff Request Channel (NB-HRCH).

The NB-DCCH includes a Narrow Band-Dependent Resource Request Channel (NB-DRRCH), a Narrow Band-Dependent Channel Quality Information Channel (NB-DCQICH), a Narrow Band-Dependent Ack/Nack Channel (NB-DANCH), and a Narrow Band-Dependent Handoff Request Channel (NB-DHRCH).

The NB-RRCH includes resource request information of an NB-MS. The NB-CQICH includes the CQI fed back by the NB-MS. The NB-ANCH includes Ack/Nack information fed back by the NB-MS when the NB communication system uses a Hybrid Automatic Retransmission Request (HARQ) scheme. The NB-HRCH includes information used for sending a handoff request from the NB-MS to the corresponding BS.

The NB-DRRCH includes resource request information of an EB-MS. Second, the NB-DCQICH includes the CQI fed back by the EB-MS. The NB-DANCH includes Ack/Nack information fed back by the EB-MS when the EB communication system uses the HARQ scheme. The NB-DHRCH includes information used for sending a handoff request from the EB-MS to the corresponding BS.

In addition to the control channels used for performing the functions described in connection with FIG. 7, control channels used for performing new functions may be included in the downlink channel structure.

Figure 8:
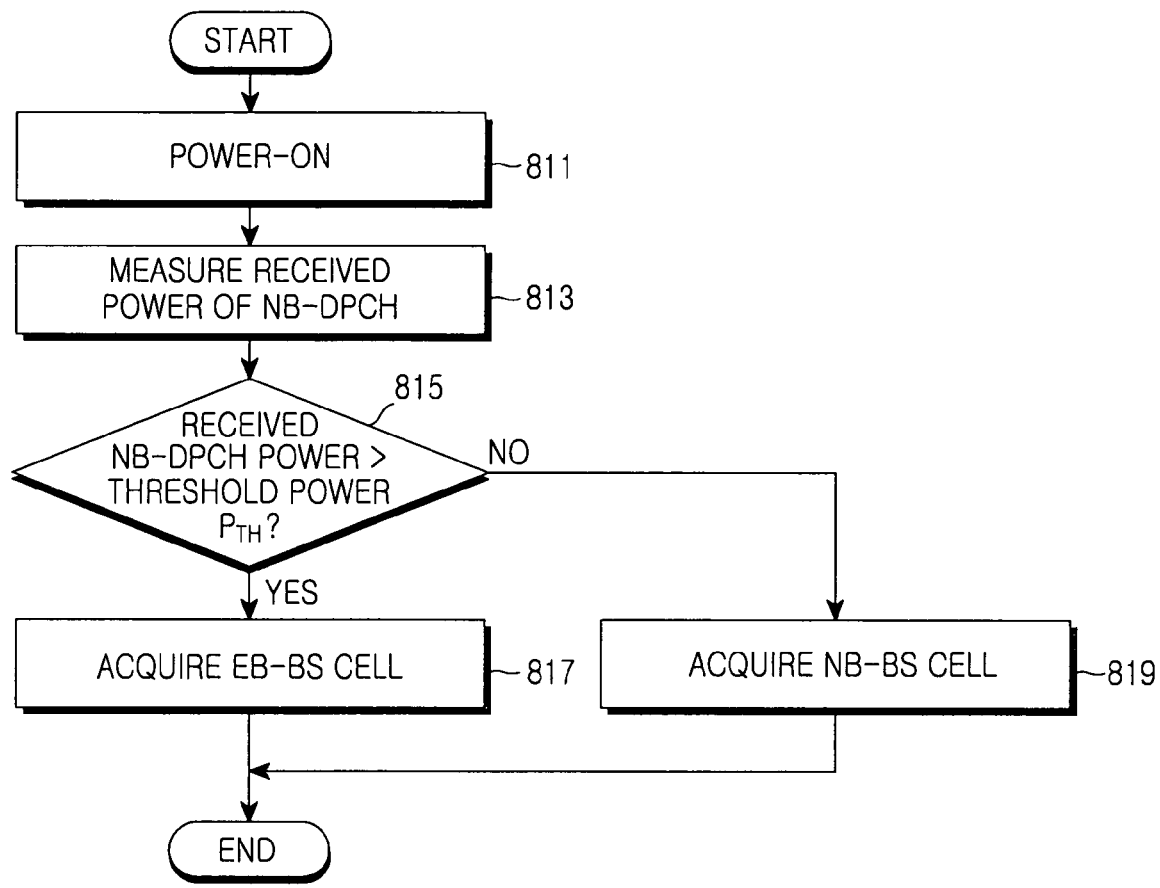
FIG. 8 is a flowchart illustrating a cell acquisition process of an EB-MS in an EB communication system according to the present invention.

FIG. 8 is a flowchart illustrating a cell acquisition process of an EB-MS in an EB communication system according to the present invention.

Referring to FIG. 8, an EB-MS turns its power on in step 811, and receives an NB-DPCH signal and measures received power of the received NB-DPCH signal in step 813. The EB-MS determines in step 815 whether the measured received power of the NB-DPCH signal exceeds a preset threshold power $P_{TH}$. If the measured received power of the NB-DPCH signal exceeds the threshold power PTH, the EB-MS proceeds to step 817. In step 817, the EB-MS performs EB-BS cell acquisition, determining that there is an EB-BS in the vicinity thereof. In the present invention, the EB-BS cell acquisition is performed through pilot pattern detection for a signal received over an EB-PICH. Preferably, in this case, the EB-MS should previously be supplied with the pilot patterns of all EB-BSs constituting the EB communication system. The EB-BS cell acquisition can be performed through various schemes such as not only pilot pattern detection but also preamble pattern detection for the signal received over the EB-PICH. After the EB-BS cell acquisition, the EB-MS performs random access to the corresponding EB-BS and then ends the process. The operation of performing random access to the EB-BS by the EB-MS will be described in detail later.

However, if it is determined in step 815 that the received power of the NB-DPCH signal does not exceed the threshold power $P_{TH}$, the EB-MS proceeds to step 819, determining that there is no EB-BS in the vicinity thereof. In step 819, the EB-MS performs NB-BS cell acquisition. In the present invention, the NB-BS cell acquisition is performed through pilot pattern detection for a signal received over the NB-PICH. Preferably, in this case, the EB-MS should be supplied with the pilot patterns of all NB-BSs constituting the NB communication system. The NB-BS cell acquisition can be performed through various schemes such as not only pilot pattern detection but also preamble pattern detection for the signal received over the NB-PICH. After the NB-BS cell acquisition, the EB-MS performs random access to the corresponding NB-BS and then ends the process. The operation of performing random access to the NB-BS by the EB-MS will be described in detail later.

Figure 9A:
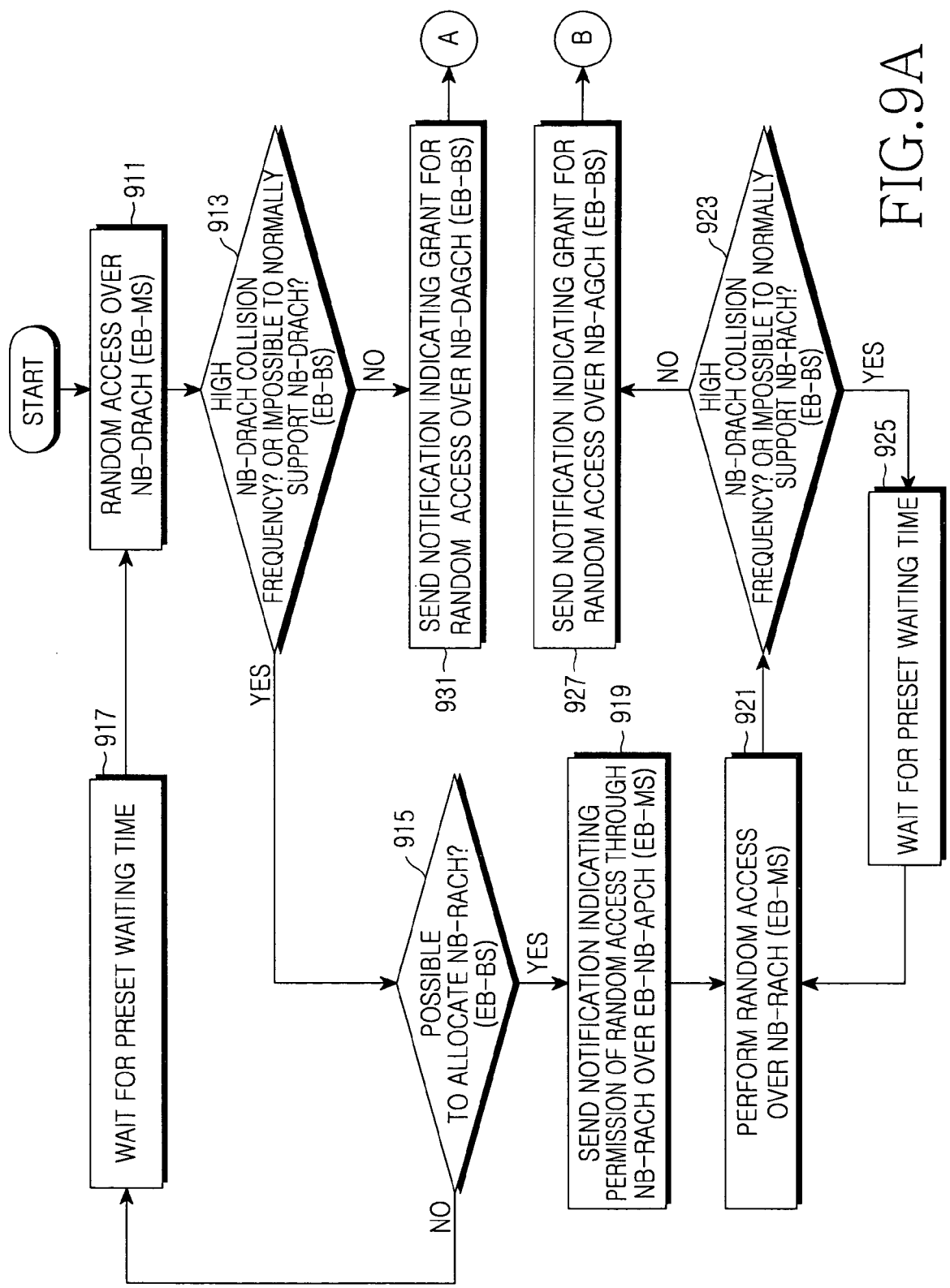

FIGS. 9A and 9B are flowcharts illustrating a traffic data transmission/reception process between an EB-MS and an EB-BS in an EB communication system according to the present invention.

It should be noted in FIGS. 9A and 9B that an operation subject of each step may differ, so each step is expressed together with its operation subject. Referring to FIGS. 9A and 9B, after cell acquisition using an EB-PICH, the EB-MS performs random access to the EB-BS using an NB-DRACH in step 911. Then the EB-BS determines in step 913 whether a collision frequency (or rate) of the NB-DRACH is high due to the large number of EB-MSs performing random access to the EB-BS using the NB-DRACH, or whether it is impossible to normally support the NB-DRACH. If the collision frequency of the NB-DRACH is greater than a threshold collision frequency, the EB-BS determines that the collision frequency of the NB-DRACH is high. The threshold collision frequency can be variably set in the EB communication system.

If it is determined that the collision frequency of the NB-DRACH is high or it is impossible to normally support the NB-DRACH, the EB-BS determines in step 915 whether it is possible to allocate an NB-RACH to the EB-MS. Herein, the EB-BS allocates the NB-RACH to the EB-MS when the collision frequency of the NB-RACH is low, i.e., only when the number of NB-MSs performing random access over the NB-RACH is relatively small. If it is determined that it is impossible to allocate the NB-RACH to the EB-MS, the EB-BS cannot allocate the NB-RACH. In this case, the EB-MS waits for a predetermined waiting time in step 917, and then performs again random access over the NB-DRACH in step 911. The EB-MS can be set using the waiting time using a Carrier Sense Multiple Access—Collision Detection (CSMA-CD) algorithm.

However, if it is determined in step 915 that it is possible to allocate the NB-RACH to the EB-MS, the EB-BS allocates the NB-RACH to the EB-MS and sends a notification indicating permission of random access over the NB-RACH, to the EB-MS through an EB-NB-APCH, in step 919. Then the EB-MS performs random access to the EB-BS through the NB-RACH in step 921. Thereafter, the EB-BS determines in step 923 whether a collision frequency of the NB-RACH is high due to the large number of NB-MSs and EB-MSs performing random access to the EB-BS using the NB-RACH, or whether it is impossible to normally support the NB-RACH. If the collision frequency of the NB-RACH is greater than a threshold collision frequency, the EB-BS determines that the collision frequency of the NB-RACH is high. The threshold collision frequency can be variably set in the EB communication system.

If it is determined in step 923 that it is determined that the collision frequency of the NB-RACH is high or it is impossible to normally support the NB-RACH, the EB-MS waits for a predetermined time in step 925, and then performs again random access to the EB-BS through the NB-RACH in step 921. If it is determined in step 923 that the collision frequency of the NB-RACH is low or it is possible to normally support the NB-RACH, the EB-BS sends a notification indicating grant of random access over the NB-RACH to the EB-MS through an NB-AGCH in step 927. Then the EB-MS sends a resource request to the EB-BS over an NB-RRCH in step 929.

However, if it is determined in step 913 that the collision frequency of the NB-DRACH is low or it is possible to support the NB-DRACH, the EB-BS sends a notification indicating grant of the random access over the NB-DRACH to the EB-MS through an NB-DAGCH in step 931. Then the EB-MS sends a resource request to the EB-BS over an NB-DRRCH in step 933.

Thereafter, the EB-BS determines in step 935 whether there is any idle resource in resources, i.e., overlay frequency band, of the NB communication system. If it is determined that there is any idle frequency resource in the overlay frequency band, the EB-BS allocates an idle resource in the overlay frequency band or an idle resource in the extended frequency band to the EB-MS, and sends information on the allocated resources to the EB-MS over NB-DL-MAPCH/NB-UL-MAPCH or NB-DDL-MAPCH/NB-DUL-MAPCH in step 937. The EB-BS allocates an idle resource in the overlay frequency band or an idle resource in the extended frequency band to the EB-MS according to a preset scheduling scheme, and a detailed description of the scheduling scheme will be omitted herein because it is not directly related to the present invention. Thereafter, the EB-MS and the EB-BS exchange traffic data with each other over an NB-TCH or an NB-DTCH in the allocated resource area in step 939.

If it is determined in step 935 that there is no idle frequency resource in the overlay frequency band, the EB-BS allocates an idle resource in the extended frequency band to the EB-MS and sends information on the allocated resource to the EB-MS over NB-DDL-MAPCH/NB-DUL-MAPCH in step 941. The EB-BS allocates an idle resource in the extended frequency band to the EB-MS according to a preset scheduling scheme, and a detailed description of the scheduling scheme will be omitted herein because it is not directly related to the present invention. Thereafter, the EB-MS and the EB-BS exchange traffic data with each other over the NB-DTCH in the allocated resource area in step 943.

Figure 10:
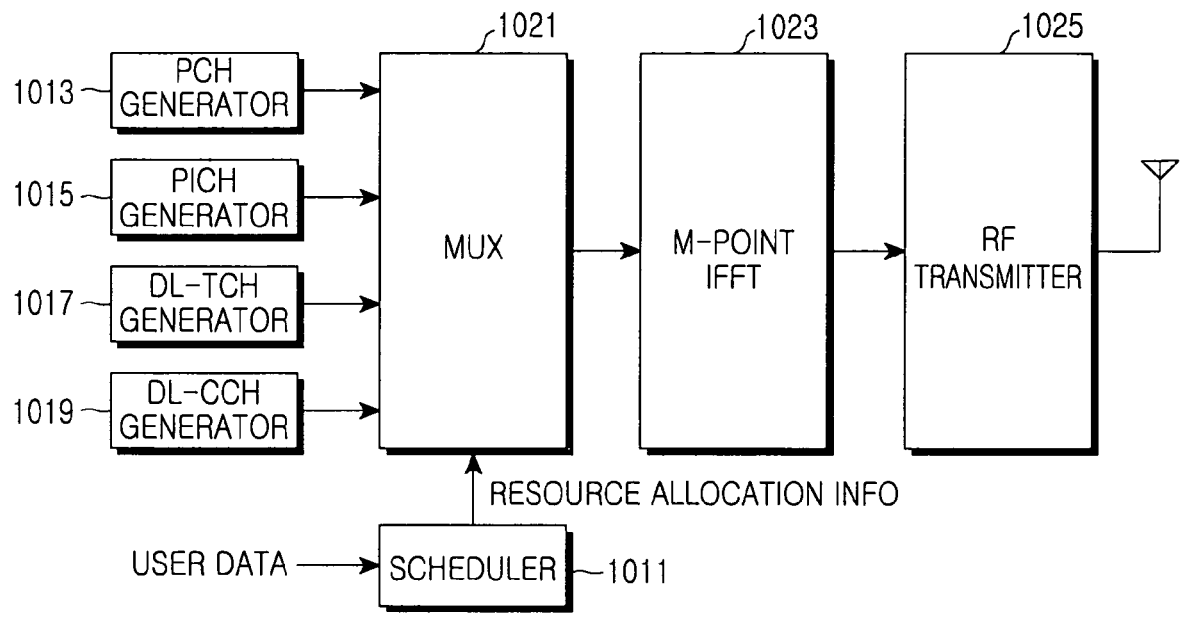
FIG. 10 is a diagram illustrating a structure of an EB-BS transmission apparatus for an EB communication system according to f the present invention.

FIG. 10 is a diagram illustrating a structure of an EB-BS transmission apparatus for an EB communication system according to the present invention.

Referring to FIG. 10, the EB-BS transmission apparatus includes a scheduler 1011, a PCH generator 1013, a PICH generator 1015, a DL-TCH generator 1017, a DL-CCH generator 1019, a multiplexer 1021, an M-point IFFT unit 1023, and a radio frequency (RF) transmitter 1025.

User data for all MSs being serviced by the EB communication system is delivered to the scheduler 1011, and the scheduler 1011 schedules the user data according to a preset scheduling scheme, and outputs the scheduled user data to the DL-TCH generator 1017 and resource allocation information for the scheduled user data to the DL-CCH generator 1019 and the multiplexer 1021. A scheduling operation of the scheduler 1011 is not directly related to the present invention, so a detailed description thereof will be omitted herein.

The PCH generator 1013 generates a PCH, i.e., an EB-PCH including an NB-PCH, a guard band signal and an NB-DPCH, and outputs the PICH to the multiplexer 1021. The PICH generator 1015 generates a PICH, i.e., an EB-PICH including an NB-PICH, a guard band signal and an NB-DPICH, and outputs the PICH to the multiplexer 1021. The DL-TCH generator 1017 generates a DL-TCH, i.e., an EB-TCH including an NB-TCH and an NB-DTCH, and outputs the DL-TCH to the multiplexer 1021. The DL-CCH generator 1019 generates a DL-CCH, i.e., an EB-CCH including an NB-CCH and an NB-DCCH, and outputs the DL-CCH to the multiplexer 1021. As described with reference to FIG. 6, the NB-CCH includes an NB-AGCH, an NB-DL-MAPCH, an NB-UL-MAPCH, an NB-CQICH and an NB-WUCH, and the NB-DCCH includes an EB-NB-APCH, an NB-DDL-MAPCH, an NB-DUL-MAPCH, an NB-DCQICH, and an NB-DWUCH.

The multiplexer 1021 generates a downlink channel by multiplexing the PCH output from the PCH generator 1013, the PICH output from the PICH generator 1015, the DL-TCH output from the DL-TCH generator 1017 and the DL-CCH output from the DL-CCH generator 1019 in the time-frequency domain according to the resource allocation information output from the scheduler 1011, and outputs the downlink channel to the M-point IFFT unit 1023.

The M-point IFFT unit 1023 performs M-point IFFT on the downlink channel output from the multiplexer 1021, and outputs the resultant signal to the RF transmitter 1025. The RF transmitter 1025 performs transmission process, i.e., RF process, on the signal output from the M-point IFFT unit 1023, and transmits the RF-processed signal over the air via an antenna.

Figure 11:
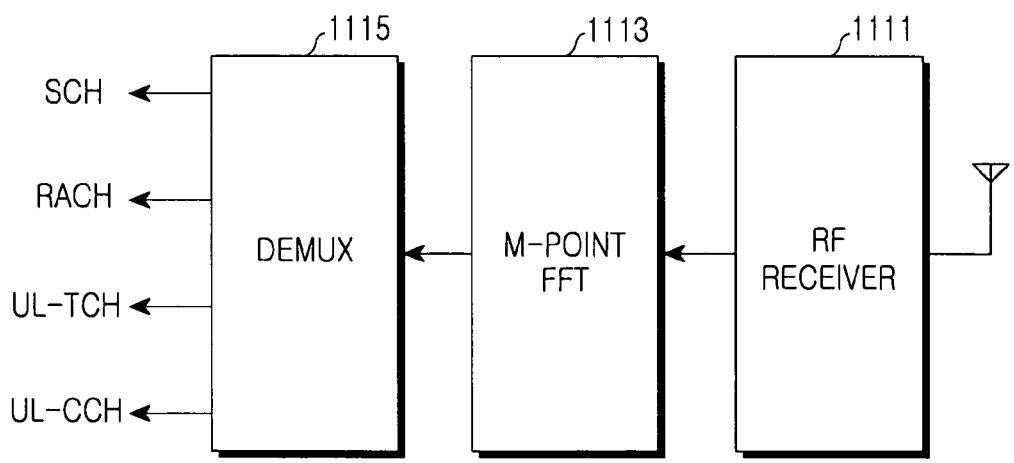
FIG. 11 is a diagram illustrating a structure of an EB-BS reception apparatus for an EB communication system according to the present invention.

FIG. 11 is a diagram illustrating a structure of an EB-BS reception apparatus for an EB communication system according to the present invention.

Referring to FIG. 11, the EB-BS reception apparatus includes an RF receiver 1111, an M-point FFT unit 1113, a demultiplexer 1115.

The RF receiver 1111 performs reception process on an RF signal received via an antenna, i.e., converts the RF signal into a baseband signal, and outputs the baseband signal to the M-point FFT unit 1113. The M-point FFT unit 1113 performs M-point FFT on the signal output from the RF receiver 1111, and outputs the resultant signal to the demultiplexer 1115. The demultiplexer 1115 demultiplexes the signal output from the M-point FFT unit 1113 in the time-frequency domain, and outputs an SCH, i.e., an EB-SCH including an NB-SCH and an NB-DSCH, an RACH, i.e., an EB-RACH including an NB-RACH and an NB-DRACH, a UL-TCH, i.e., an EB-TCH including an NB-TCH and an NB-DTCH, and an UL-CCH, i.e., an EB-CCH including an NB-CCH and an NB-DCCH. As described with reference to FIG. 7, the NB-CCH includes an NB-RRCH, an NB-CQICH, an NB-ANCH and an NB-HRCH, and the NB-DCCH includes an NB-DRRCH, an NB-DCQICH, an NB-DANCH and an NB-DHRCH.

Figure 12:
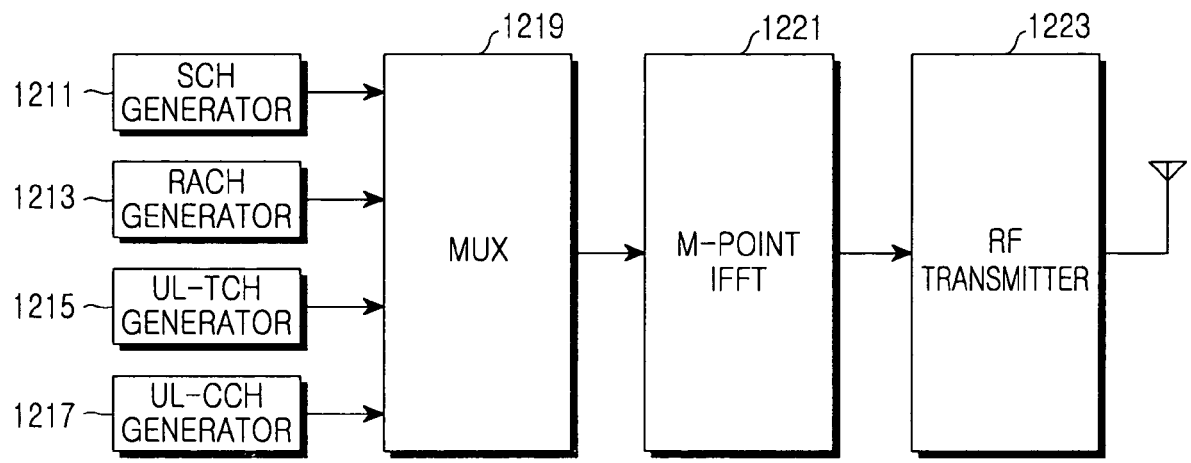
FIG. 12 is a diagram illustrating a structure of an EB-MS transmission apparatus for an EB communication system according to the present invention.

FIG. 12 is a diagram illustrating a structure of an EB-MS transmission apparatus for an EB communication system according to the present invention.

Referring to FIG. 12, the EB-MS transmission apparatus includes an SCH generator 1211, an RACH generator 1213, a UL-TCH generator 1215, a UL-CCH generator 1217, a multiplexer 1219, an M-point IFFT unit 1221, and an RF transmitter 1223.

The SCH generator 1211 generates an SCH, i.e., an EB-SCH including an NB-SCH, a guard band signal and an NB-DSCH, and outputs the SCH to the multiplexer 1219. The RACH generator 1213 generates an RACH, i.e., an EB-RACH including an NB-RACH and an NB-DRACH, and outputs the RACH to the multiplexer 1219. The UL-TCH generator 1215 generates a UL-TCH, i.e., an EB-TCH including an NB-TCH and an NB-DTCH, and outputs the UL-TCH to the multiplexer 1219. The UL-CCH generator 1217 generates a UL-CCH, i.e., an EB-CCH including an NB-CCH and an NB-DCCH, and outputs the UL-CCH to the multiplexer 1219. As described with reference to FIG. 7, the NB-CCH includes an NB-RRCH, an NB-CQICH, an NB-ANCH and an NB-HRCH, and the NB-DCCH includes an NB-DRRCH, an NB-DCQICH, an NB-DANCH, and an NB-DHRCH.

Although it is assume in FIG. 12 that the SCH generator 1211, the RACH generator 1213, the UL-TCH generator 1215 and the UL-CCH generator 1217 generate all channels available in the EB communication system to support the EB communication system, corresponding channels can be generated under the control of the EB communication system. For example, the RACH generator 1213 generates only the NB-RACH when an EB-BS permits random access over the NB-RACH.

Figure 13:
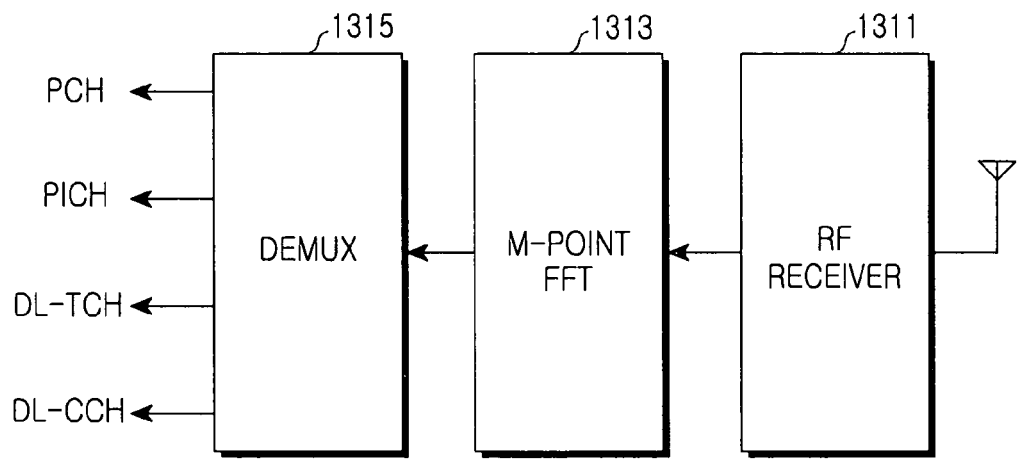
FIG. 13 is diagram illustrating a structure of an EB-MS reception apparatus for an EB communication system according to the present invention.

FIG. 13 is diagram schematically illustrating a structure of an EB-MS reception apparatus for an EB communication system according to the present invention.

Referring to FIG. 13, the EB-MS reception apparatus includes an RF receiver 1311, an M-point FFT unit 1313 and a demultiplexer 1315.

The RF receiver 1311 performs reception process on an RF signal received via an antenna, i.e., converts the RF signal into a baseband signal, and outputs the baseband signal to the M-point FFT unit 1313. The M-point FFT unit 1313 performs M-point FFT on the signal output from the RF receiver 1311, and outputs the resultant signal to the demultiplexer 1315. The demultiplexer 1315 demultiplexes the signal output from the M-point FFT unit 1313 in the time-frequency domain, and outputs a PCH, i.e., an EB-PCH including an NB-PCH and an NB-DPCH, a PICH, i.e., an EB-PICH including an NB-PICH, a guard band signal and an NB-DPICH, a DL-TCH, i.e., an EB-TCH including an NB-TCH and an NB-DTCH, and a DL-CCH, i.e., an EB-CCH including an NB-CCH and an NB-DCCH. As described with reference to FIG. 6, the NB-CCH includes an NB-AGCH, an NB-DL-MAPCH, an NB-UL-MAPCH, an NB-CQICH and an NB-WUCH, and the NB-DCCH includes an EB-NB-APCH, an NB-DDL-MAPCH, an NB-DUL-MAPCH, an NB-DCQICH and an NB-DWUCH.

Although it is assume in FIG. 13 that the EB-MS reception apparatus receives all channels available in the EB communication system to support the EB communication system, corresponding channels can be generated under the control of the EB communication system. For example, the EB-MS reception apparatus can receive only one of or both of the NB-TCH and the NB-DTCH under the control of the EB-BS.

The present invention has the following advantages.

(1) Reduction in License Cost for Frequency Band

The use of the frequency overlay scheme according to the present invention requires only the additional license cost for the bandwidth additionally increased. As a result, the burden of the license cost for the frequency bands on the service providers decreases because they are allowed to bear only the additional license cost.

(2) Increase in Frequency Resource Efficiency in Overlay Frequency Band

The use of the frequency overlay scheme according to the present invention increases frequency resource efficiency in the overlaid frequency band. That is, basically, user access increases in number in the overlay frequency band, maximizing the multiuser diversity gain. The maximization of the multiuser diversity gain contributes to an increase in the frequency resource efficiency. Because the frequency resource efficiency is closely related to the profits the service provides, the use of the frequency overlay scheme gives the economic advantages to the service providers.

(3) Guarantee on Functions of Existing Users in Overlay Frequency Band

The application of the frequency overlay scheme according to the present invention guarantees the intact functions of the existing users, i.e., NB-MSs, before the application of the frequency overlay scheme.

(4) Preparation for Extension to Broadband System Supporting Backward Compatibility Because the application of the frequency overlay scheme according to the present invention guarantees the intact functions of the existing users, i.e., NB-MSs, before the application of the frequency overlay scheme, and also supports the broadband service, it can provide a basis of the evolutionary development to the next generation communication system.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A transmission apparatus in a frequency overlay communication system using a first frequency band and a second frequency band, the apparatus comprising:
    a preamble channel generator for generating a preamble channel signal;
    a pilot channel generator for generating a pilot channel signal;
    a traffic channel generator for generating a traffic channel signal;
    a control channel generator for generating a control channel signal;
    a scheduler for, upon generation of data to be transmitted, scheduling the data and allocating a frequency band over which the data is to be transmitted according to the second frequency band;
    a multiplexer for generating a downlink channel signal by multiplexing the preamble channel signal, the pilot channel signal, the traffic channel signal, and the control channel signal according to information on the allocated frequency band; and
    an inverse fast Fourier transform (IFFT) unit for performing IFFT on the downlink channel signal,
    wherein the second frequency band includes the first frequency band and a third frequency band that is dependent on the second frequency band,
    wherein the preamble channel signal includes a first preamble channel signal transmitted over the first frequency band, and a second preamble channel signal transmitted over the third frequency band,
    wherein the pilot channel signal includes a first pilot channel signal transmitted over the first frequency band, and a second pilot channel signal transmitted over the third frequency band,
    wherein the traffic channel signal includes a first traffic channel signal transmitted over the first frequency band, and a second traffic channel signal transmitted over the third frequency band, and
    wherein the control channel signal includes a first control channel signal transmitted over the first frequency band, and a second control channel signal transmitted over the third frequency band.

2. The transmission apparatus of claim 1, wherein the second frequency band further includes a guard band preset between the first frequency band and the third frequency band.

3. The transmission apparatus of claim 1, wherein the IFFT unit performs M-point IFFT on the downlink channel signal, wherein M denotes a number of points applied to the second frequency band.

4. The transmission apparatus of claim 1, wherein the first control channel signal comprises:
    a third control channel signal including information indicating grant of random access, the information being transmitted over the first frequency band in response to random access from the transmission apparatus and the random access being received over the first frequency band from a reception apparatus associated with the transmission apparatus;
    a fourth control channel signal including downlink frequency band allocation information for the first frequency band;
    a fifth control channel signal including uplink frequency band allocation information for the first frequency band;
    a sixth control channel signal including a channel quality information amount that the reception apparatus should feed back for the first frequency band; and
    a seventh control channel signal including information used for waking up the reception apparatus in a sleep mode, when the reception apparatus is in the sleep mode.

5. The transmission apparatus of claim 4, wherein the second control channel signal comprises:
    an eighth control channel signal including information for granting a possibility of random access over the first frequency band by the reception apparatus, the information being transmitted over the third frequency band;
    a ninth control channel signal including information indicating grant of random access, the information being transmitted over the third frequency band in response to random access from the transmission apparatus and the random access being received over the third frequency band from the reception apparatus;
    a tenth control channel signal including downlink frequency band allocation information for the third frequency band;
    an eleventh control channel signal including uplink frequency band allocation information for the third frequency band;
    a twelfth control channel signal including a channel quality information amount that the reception apparatus should feed back for the third frequency band; and
    a thirteenth control channel signal including information used for waking up the reception apparatus in the sleep mode, when the reception apparatus is in the sleep mode.

6. A transmission method in a frequency overlay communication system using a first frequency band and a second frequency band, the method comprising:
    generating a preamble channel signal;
    generating a pilot channel signal;
    generating a traffic channel signal;
    generating a control channel signal;
    upon generation of data to be transmitted, scheduling the data and allocating a frequency band over which the data is to be transmitted according to the second frequency band;
    generating a downlink channel signal by multiplexing the preamble channel signal, the pilot channel signal, the traffic channel signal, and the control channel signal according to information on the allocated frequency band; and
performing inverse fast Fourier transform (IFFT) on the downlink channel signal,
    wherein the second frequency band includes the first frequency band and a third frequency band that is dependent on the second frequency band
    wherein the preamble channel signal includes a first preamble channel signal transmitted over the first frequency band, and a second preamble channel signal transmitted over the third frequency band, wherein the pilot channel signal includes a first pilot channel signal transmitted over the first frequency band, and a second pilot channel signal transmitted over the third frequency band, wherein the traffic channel signal includes a first traffic channel signal transmitted over the first frequency band, and a second traffic channel signal transmitted over the third frequency band, and wherein the control channel signal includes a first control channel signal transmitted over the first frequency band, and a second control channel signal transmitted over the third frequency band.

7. The transmission method of claim 6, wherein the second frequency band further includes a guard band preset between the first frequency band and the third frequency band.

8. The transmission method of claim 6, wherein performing IFFT on the downlink channel signal comprises performing M-point IFFT on the downlink channel signal, wherein M denotes a number of points applied to the second frequency band.

9. The transmission method of claim 8, wherein the first control channel signal comprises:
   a third control channel signal including information indicating a grant of random access, the information being transmitted over the first frequency band in response to random access from the transmission apparatus and the random access being received over the first frequency band from a reception apparatus associated with the transmission apparatus;
   a fourth control channel signal including downlink frequency band allocation information for the first frequency band;
   a fifth control channel signal including uplink frequency band allocation information for the first frequency band;
   a sixth control channel signal including a channel quality information amount that the reception apparatus should feed back for the first frequency band; and
   a seventh control channel signal including information used for waking up the reception apparatus in a sleep mode when the reception apparatus is in the sleep mode.

10. The transmission method of claim 9, wherein the second control channel signal comprises:
    an eighth control channel signal including information for granting a possibility of random access over the first frequency band by the reception apparatus, the information being transmitted over the third frequency band;
    a ninth control channel signal including information indicating a grant of random access, the information being transmitted over the third frequency band in response to random access from the transmission apparatus and the random access being received over the third frequency band from the reception apparatus;
    a tenth control channel signal including downlink frequency band allocation information for the third frequency band;
    an eleventh control channel signal including uplink frequency band allocation information for the third frequency band;
    a twelfth control channel signal including a channel quality information amount that the reception apparatus should feed back for the third frequency band; and
    a thirteenth control channel signal including information used for waking up the reception apparatus in the sleep mode, when the reception apparatus is in the sleep mode.

11. A transmission apparatus in a frequency overlay communication system using a first frequency band and a second frequency band, the apparatus comprising:

a synchronization channel generator for generating a synchronization channel signal;

a random access channel generator for generating a random access channel signal;

a traffic channel generator for generating a traffic channel signal;

a control channel generator for generating a control channel signal;

a multiplexer for generating an uplink channel signal by multiplexing the synchronization channel signal, the random access channel signal, the traffic channel signal, and the control channel signal, based on a previous frequency band allocation of the second frequency band; and an inverse fast Fourier transform (IFFT) unit for performing IFFT on the uplink channel signal, wherein the second frequency band includes the first frequency band and a third frequency band that is dependent on the second frequency band, wherein the synchronization channel signal includes a first synchronization channel signal transmitted over the first frequency band, and a second synchronization channel signal transmitted over the third frequency band, wherein the random access channel signal includes a first random access channel signal transmitted over the first frequency band, and a second random access channel signal transmitted over the third frequency band, wherein the traffic channel signal includes a first traffic channel signal transmitted over the first frequency band, and a second Waffle channel signal transmitted over the third frequency band, and wherein the control channel signal includes a first control channel signal transmitted over the first frequency band, and a second control channel signal transmitted over the third frequency band.

12. The transmission apparatus of claim 11, wherein the second frequency band further comprises a guard band preset between the first frequency band and the third frequency band.

13. The transmission apparatus of claim 11, wherein the IFFT unit performs M-point IFFT on the uplink channel signal, wherein M denotes a number of points applied to the second frequency band.

14. The transmission apparatus of claim 11, wherein the first control channel signal comprises:
    a third control channel signal including information used for sending a request for a frequency band from a reception apparatus associated with the transmission apparatus, the information being transmitted over the first frequency band;
    a fourth control channel signal including channel quality information for the first frequency band;
    a fifth control channel signal including acknowledge/negative acknowledge information for received data when a non-frequency overlay communication system uses a hybrid automatic retransmission request (HARQ) scheme; and
    a sixth control channel signal including information used for sending a request for handoff to another transmission apparatus other than the transmission apparatus to which the reception apparatus currently belongs.

15. The transmission apparatus of claim 14, wherein the second control channel signal comprises:
    a seventh control channel signal including information used for sending a request for a frequency band from a reception apparatus associated with the transmission apparatus, the information being transmitted over the third frequency band;

an eighth control channel signal including channel quality information for the third frequency band;

a ninth control channel signal including acknowledge/negative acknowledge information for received data when a non-frequency overlay communication system uses the hybrid automatic retransmission request (HARQ) scheme; and a tenth control channel signal including information used for sending a request for handoff to another transmission apparatus other than the transmission apparatus to which the reception apparatus currently belongs.

16. A transmission method in a frequency overlay communication system using a first frequency band and a second frequency band, the method comprising:

generating a synchronization channel signal;

generating a random access channel signal;

generating a traffic channel signal;

generating a control channel signal;

generating an uplink channel signal by multiplexing the synchronization channel signal, the random access channel signal, the traffic channel signal, and the control channel signal, said multiplexing based on a previous allocation of a frequency band of the second frequency band; and performing inverse fast Fourier transform (IFFT) on the uplink channel signal, wherein the second frequency band includes the first frequency band and a third frequency band that is dependent on the second frequency band, wherein the synchronization channel signal includes a first synchronization channel signal transmitted over the first frequency band, and a second synchronization channel signal transmitted over the third frequency band, wherein the random access channel signal includes a first random access channel signal transmitted over the first frequency band, and a second random access channel signal transmitted over the third frequency band, wherein the traffic channel signal includes a first traffic channel signal transmitted over the first frequency band, and a second traffic channel signal transmitted over the third frequency band, and wherein the control channel signal includes a first control channel signal transmitted over the first frequency band, and a second control channel signal transmitted over the third frequency band.

17. The transmission method of claim 16, wherein the second frequency band further includes a guard band preset between the first frequency band and the third frequency band.

18. The transmission method of claim 16, further comprising:

radio frequency (RF)-processing the IFFT-processed signal; and transmitting the RF-processed signal.

19. The transmission method of claim 18, wherein performing IFFT on the uplink channel signal comprises performing M-point IFFT on the uplink channel signal, wherein M denotes a number of points applied to the second frequency band.

20. The transmission method of claim 16, wherein the first control channel signal comprises:

a third control channel signal including information used for sending a request for a frequency band from a reception apparatus associated with the transmission apparatus, the information being transmitted over the first frequency band;

a fourth control channel signal including channel quality information for the first frequency band;

a fifth control channel signal including acknowledge/negative acknowledge information for received data when a non-frequency overlay communication system uses a hybrid automatic retransmission request (HARQ) scheme; and a sixth control channel signal including information used for sending a request for handoff to another transmission apparatus other than the transmission apparatus to which the reception apparatus currently belongs.

21. The transmission method of claim 20, wherein the second control channel signal comprises:

a seventh control channel signal including information used for sending a request for a frequency band from a reception apparatus associated with the transmission apparatus, the information being transmitted over the third frequency band;

an eighth control channel signal including channel quality information for the third frequency band;

a ninth control channel signal including acknowledge/negative acknowledge information for received data when a non-frequency overlay communication system uses the hybrid automatic retransmission request (HARQ) scheme; and a tenth control channel signal including information used for sending a request for handoff to another transmission apparatus other than the transmission apparatus to which the reception apparatus currently belongs.

* * * * *